UNITED STATES PATENT OFFICE.

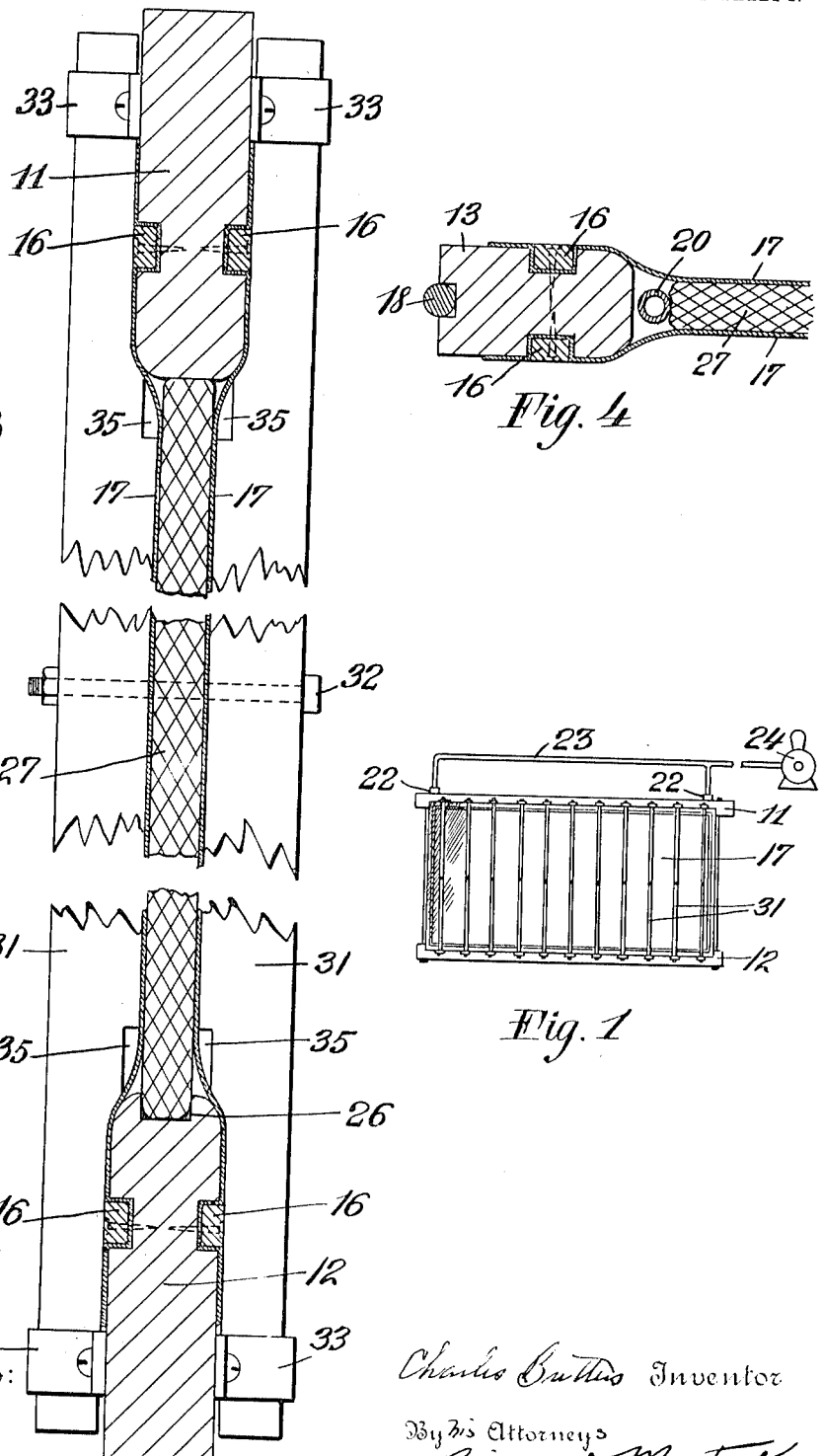

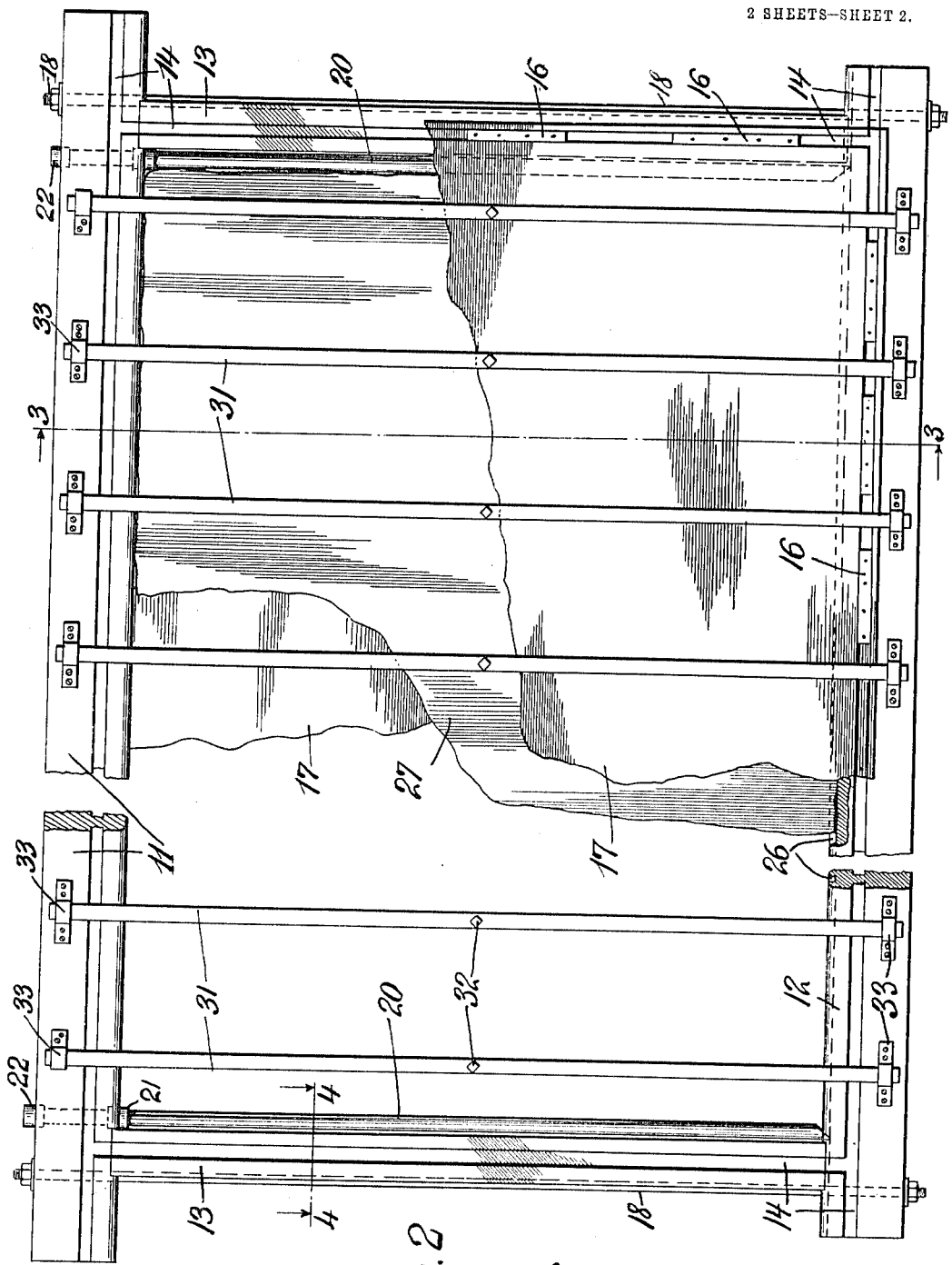

CHARLES BUTTERS, OF OAKLAND, CALIFORNIA.

FILTER-LEAF.

1,078,993.   Specification of Letters Patent.   Patented Nov. 18, 1913.

Application filed September 25, 1912. Serial No. 722,364.

*To all whom it may concern:*

Be it known that I, CHARLES BUTTERS, a citizen of the United States, and a resident of Oakland, in the State of California, mining engineer, have invented certain new and useful Improvements in Filter-Leaves, of which the following is a specification, accompanied by drawings.

The invention relates to suction filter leaves, but it will be readily seen that the leaves may be used in closed pressure chambers and operated by pressure instead of suction, the filtrate cake in either case being deposited upon the outside of the filter and the filter passing inward and being carried off by suitable eduction pipes.

The filter cloths of metallurgical and other filters are subject to rapid wear, and also, in most instances, the filter cloths need to be treated with acid or washed or otherwise treated to remove deposits from the interstices of the cloth, if the cloths are not often renewed. It is desirable, therefore, to have the cloths readily removable and renewable without any considerable expense either of material or labor.

The principal objects of the present improvement are to produce a filter leaf that is simple and economical in structure, durable and reliable in use, and which provides for the ready application and removal of the filter cloth without requiring any seaming or sewing, and which provides means for securing and utilizing flat sheets of filter cloth without requiring it to be made into bags or otherwise sewn.

Certain other objects will be apparent from the description of the filter, and it will also be apparent that some features of the invention may be used without all the features described.

The accompanying drawings show the best form of this improved filter leaf known to me at the present time.

In the drawings, Figure 1 is a face view of the improved filter leaf showing its connections to a pump and omitting the filter tank; Fig. 2 is a detail view of the leaf, parts being removed or broken away to show the construction; Fig. 3 is a vertical sectional detail view of the same on the line 3—3 of Fig. 2; Fig. 4 is a detail view in section on the line 4—4 of Fig. 2.

The main frame of the leaf comprises four wooden members drawn together at the corners by bolts. The horizontal members 11, 12, are recessed to form a strong joint with the two uprights 13, as shown, and all four members of the frame have channels 14 in each face of the leaf for receiving wooden strips 16 by which the filter cloth, preferably of drilling such as stark or ozark 17 may be tightly secured on each face of the leaf. The upper frame member 11 projects at each end sufficiently to form a support for hanging the filter leaf in the filter tank. Bolts 18, preferably running in channels along the uprights 13, as shown, and provided with nuts for tightening them, serve to draw the frame tightly together at its four corners.

Along the innermost side of the two uprights 13 extend tubes 20 for applying suction to the filter during the filtering operation and for applying pressure to the interior of the filter when it is desired to discharge the filter cakes. Each of these tubes 20 has a union or collar 21 fitting beneath the frame member 11 and the union 22 fitting above that frame member. The tube which passes through the frame member is thereby held firmly in position in the leaf, and by the unions 22 the pipe or pipes 23 may be connected with the filter for applying suction and pressure thereto; for example, by a pump 24. The lower ends of the tubes 20 are open and are cut off at about forty-five degrees, as shown, these ends extending into the horizontal groove 26 which runs along the upper surface of the lower frame member 12.

The two filter cloths 17 are separated by a rectangular pervious sheet 27, preferably of cocoa matting. This substantially fits and occupies the central rectangular space of the filter frame. This gives an interior support for the two filter cloths 17 and provides many channels through which the solution or filtrate can readily find its way to the open mouth of the lower end of the suction tubes 20, as will be readily understood. The channel 26 in the lower frame member assists in holding the sheet of cocoa matting in place. It also provides an additional channel running horizontally to the open ends of the tubes 20. The lower edge of the cocoa matting may fit into this channel 26.

The filter cloths are confined on either side by a series of wooden strips 31 placed at short intervals on each face of the leaf. These strips 31 are arranged in pairs opposite each other and bolted through the leaf at their mid-length by means of bolts 32. The ends of the strips are fitted to the upper and lower frame members, as shown, and are removably secured thereto by metal holders 33. The inner edges of the strips, as seen in Fig. 3, confine the filter cloth against the cocoa matting; but, near the upper and lower ends of the strips, spaces 35 are left, allowing greater freedom to the filter cloth, particularly at the lower edge of the cocoa matting, allowing free communication horizontally to the tubes 20 for the flow of fluid inside the filter leaf.

The application and removal of the filter cloths to and from the filter leaves without requiring any stitching is extremely simple. Taking the empty frame with the strips 31 removed, a flat sheet of filter cloth 17 can be laid upon one face, and then the strips 16 forced into the channels 14, tightening the filter cloth and securing it in the channels. The strips 16 are preferably held in place by tacks or nails. Next the strips 31 on the same face of the filter can be secured in place. The leaf can then be laid down upon that face and the sheet 27 of cocoa matting laid in place from the other side, after which the filter cloth on that other side can be applied and secured in place as before and the strips 31 secured in place upon it, and finally the bolts 32 inserted and drawn up.

It will be seen that the need of filter bags is obviated, and thin, relatively cheap filter cloth may be used and discarded and renewed at frequent intervals.

As a result of the easily demountable features of the leaf as above described, a lighter cloth may be used as the filtering medium, because it is not so essential that the filter be kept clean. This makes the leaf more efficient because filtration is more rapid with a light medium than with a heavy one under given conditions. It is also much cheaper than a heavy medium. In this construction when the filler gets incrusted with deposit it can be taken out and cleaned with very little labor and delay and will last indefinitely.

The removal of the filter cloth is manifestly easy of accomplishment, it being only necessary to remove the bolts 32 and release the strips 31 at one end, draw them out from their holders 33 at the other end and pull out the strips 16 which secure the filter cloths.

It will be seen that in the construction just illustrated and described, and particularly by consideration of Figs. 3 and 4, the active areas of the filter cloth are concave adjacent to the members of the frame, so that the filter cakes formed thereon will have thin edges.

It will be readily seen that considerable latitude may be allowed in the minor details of the invention.

I claim the following:

1. In a suction filter leaf the combination of a frame, filtering media mounted on said frame and readily detachable therefrom, a pervious porous filler between said media adapted to limit the proximity of said media to each other, a plurality of strips detachably mounted on each face of said leaf for limiting the outward movement of said media, whereby said parts are readily demountable.

2. In a suction filter leaf the combination of a frame, filtering media mounted on said frame and readily detachable therefrom, a pervious porous filler between said media adapted to limit the proximity of said media to each other, a plurality of strips detachably mounted on each face of said leaf for limiting the outward movement of said media, whereby said parts are readily demountable to permit cleaning of said filler.

3. In a suction filter leaf the combination of a frame having grooves on both faces; filter media adapted to cover said grooves, means for securing said media in each groove, a pervious filler between said media adapted to limit the proximity of said media to each other, a pipe communicating with the interior of said leaf and a plurality of strips detachably mounted on the outside of each face of said leaf adapted to limit the outward movement of said media.

4. A filter leaf for vacuum filters and other uses, comprising an open frame having grooves for securing the filter fabric thereto, extending around the filtering area, filter fabric laid on each face of the frame and secured thereon by means of strips confining the fabric to the said grooves, one or more tubes extending through the frame between the filter fabrics and opening adjacent to the lower member of the frame, a sheet of permeable material lying between the filtering fabrics, and a series of detachable strips secured on each face of the leaf at intervals and confining the filter fabric.

5. In a suction filter leaf the combination of a frame having grooves on both faces thereof, filtering media adapted to cover said grooves, means for securing said media at all points in said grooves, a pervious filler between said media adapted to limit the proximity of said media to each other, a plurality of strips detachably mounted opposite each other on the two faces of said leaf, means on a frame member into which one end of each strip may be loosely placed and means passing through two corresponding strips and the leaf intermediate the fastened end of said strips and the other end thereof whereby said strips are readily demountable and limit the outward movement of said media.

In testimony whereof I have signed this specification in the presence of two subscribing witnesses this 9th day of September, 1912.

CHARLES BUTTERS.

Witnesses:
SIGMUND FREUND,
A. SCHMIDT.